(No Model.) 5 Sheets—Sheet 1.

R. S. ERSKINE.
BRAKE FOR CYCLES OR OTHER WHEELED VEHICLES.

No. 514,819. Patented Feb. 13, 1894.

(No Model.) 5 Sheets—Sheet 2.
R. S. ERSKINE.
BRAKE FOR CYCLES OR OTHER WHEELED VEHICLES.
No. 514,819. Patented Feb. 13, 1894.
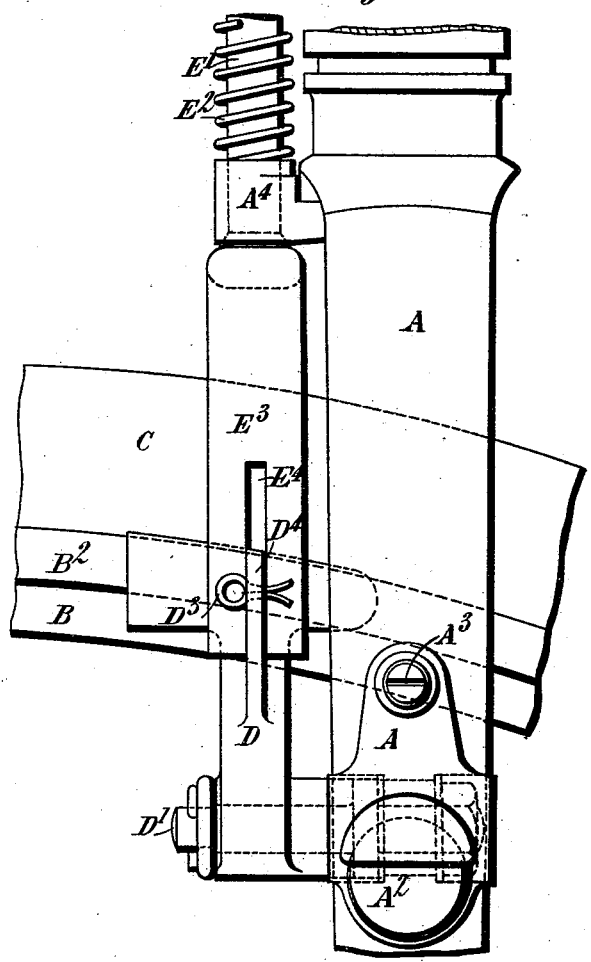

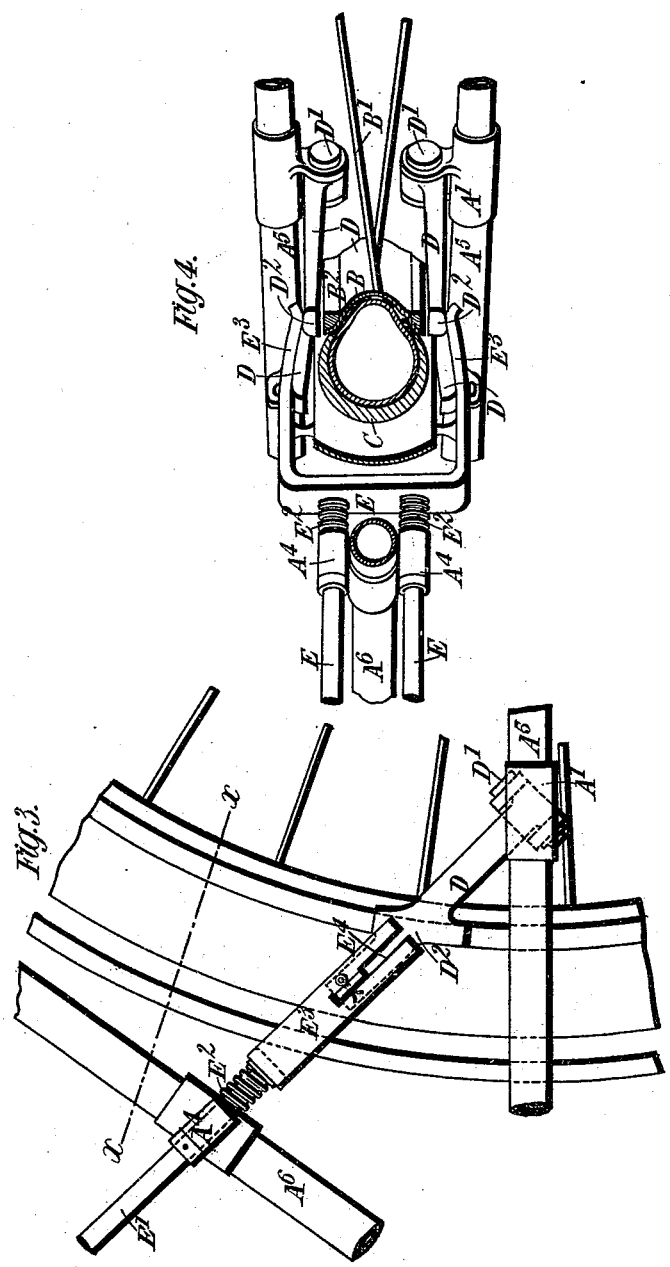

(No Model.) 5 Sheets—Sheet 4.
R. S. ERSKINE.
BRAKE FOR CYCLES OR OTHER WHEELED VEHICLES.
No. 514,819. Patented Feb. 13, 1894.

(No Model.) 5 Sheets—Sheet 5.
R. S. ERSKINE.
BRAKE FOR CYCLES OR OTHER WHEELED VEHICLES.
No. 514,819. Patented Feb. 13, 1894.
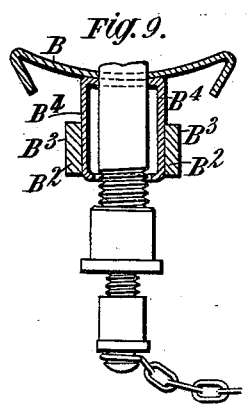
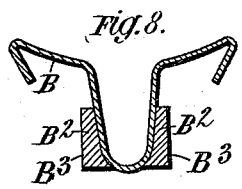

UNITED STATES PATENT OFFICE.

ROBERT STEUART ERSKINE, OF LONDON, ENGLAND.

BRAKE FOR CYCLES OR OTHER WHEELED VEHICLES.

SPECIFICATION forming part of Letters Patent No. 514,819, dated February 13, 1894.

Application filed June 26, 1893. Serial No. 478,854. (No model.)

*To all whom it may concern:*

Be it known that I, ROBERT STEUART ERSKINE, a subject of the Queen of Great Britain, and a resident of The Savoy, London, England, have invented certain new and useful Improvements Relating to Brakes for Cycles or other Wheeled Vehicles, of which the following is a specification, reference being had to the accompanying drawings.

My invention relates to brakes for bicycles, tricycles and other vehicles.

When using wheels fitted with pneumatic or other elastic tires it has been found very inconvenient to apply the brake to the tire, and various devices such as band brakes and brakes applied to the rim of the wheel have been used for the purpose of avoiding this inconvenience.

According to my invention I secure brake-rings to the rim of the wheel the brake blocks being arranged to be applied against the face of said brake-rings. The said brake-rings may be secured to the wheel in any suitable manner and they may be adapted to be easily removable therefrom if desired. I also provide two brake blocks adapted to be applied to the brake-rings secured to the wheel rim. The brake blocks may be furnished with detachable faces of metal or "woodite" or other suitable material if desired. I provide moreover a brake fork having inclined arms one of which is adapted to press on the back of each brake-block. The backs of the brake-blocks are suitably formed so that when the fork is operated either by being pushed toward or pulled away from the center of the wheel, the brake blocks are pressed more or less firmly against the brake-rings. The fork is arranged to be operated either by the hand or by the feet, and the entire apparatus may be fitted to any of the wheels of the vehicle which may be found convenient.

In order that my invention may be more clearly understood I will now proceed to describe the same by the aid of the accompanying drawings which for the sake of example show my improved brake in combination with velocipede wheels.

Figure 1:
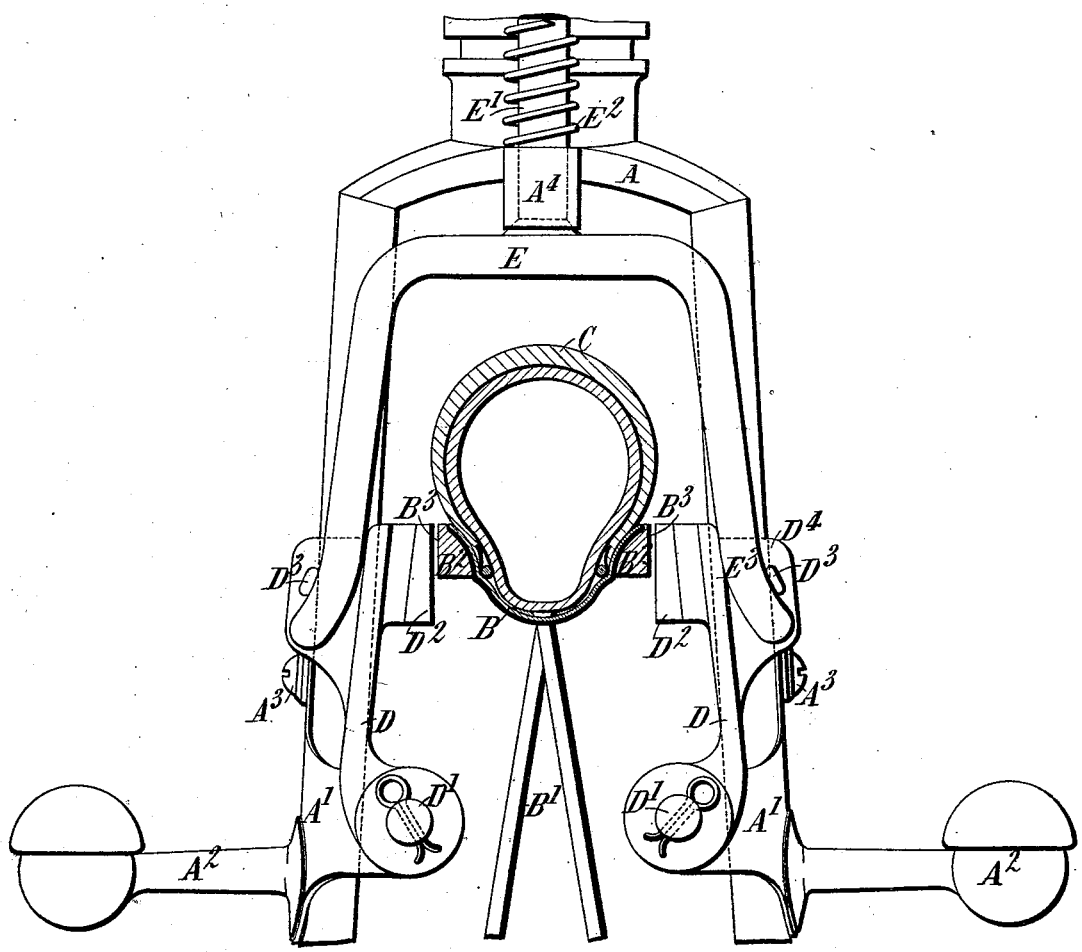
Figure 5:
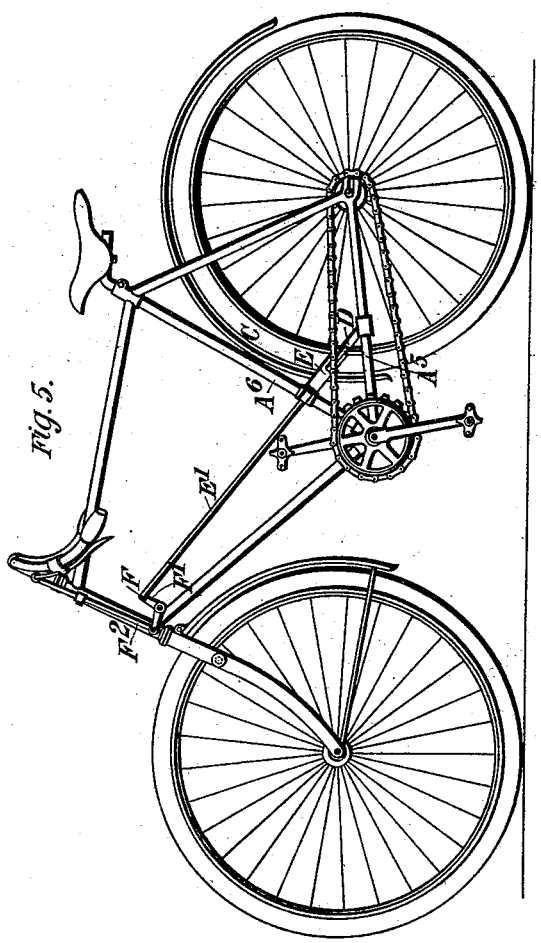

Figure 1 is a front view of a brake constructed according to my invention attached to the front fork of the machine, the wheel rim and the tire being shown in section. Fig. 2 is a side view of the same. Fig. 3 is a side view showing my improved brake arranged to be applied on the back wheel of the machine. Fig. 4 is a section on line $x, x$, Fig. 3, and Fig. 5 is a side view of a machine fitted with a back wheel brake and drawn to a smaller scale. Fig. 6 is a cross section of a wheel rim fitted with brake rings according to my invention. Figs. 7 and 8 are similar views showing brake-rings secured to rims of different sections. Fig. 9 is a similar view showing a modification of my invention.

Like letters of reference denote similar parts in all the drawings.

A is the front fork of the machine; B the rim of the front wheel and B' the spokes thereof.

$B^2 B^2$ are the brake-rings secured to the rim by any suitable means; C the tire which is for example of the kind known as a "Dunlop detachable" tire.

A' are plates which carry the foot rests $A^2$ and which are secured to the depending arms of the front fork A in the usual manner, an additional safety screw $A^3$ being preferably provided to prevent the plates from slipping. The securing bolts of said plates A' are extended to form pins D' on which the levers D are pivoted. In some cases however I pivot the levers D to the front fork independently of the foot rest brackets. The said levers carry at their upper ends brake blocks $D^2$, $D^2$, made of any suitable material such as "woodite" or they may be of metal in which case I sometimes make them in one piece with their respective levers.

E is a fork carried by the brake rod E' which slides in guides $A^4$ secured to the front fork A. The said rod is operated to move up and down in the guides by a lever pivoted on the handle bar in the usual manner and is provided with a spring $E^2$ which tends to move it in a direction away from the center of the wheel. The arms $E^3$ of the fork E are inclined to each other and are adapted to bear on the back of the brake-block levers D as shown. When the brake lever is operated, the said fork E is pressed toward the center of the wheel against the force of the spring $E^2$ and the inclined arms thereof sliding along the back of the levers D cause said levers to turn on their pivots D' and force the brake-blocks D² into contact with the brake-rings B² attached to the rim, thus braking the wheel. When the brake lever is released the fork E is pulled by the spring E² in a direction away from the center of the wheel and the arms E³ engage with the pins D³ on the brake-block levers D thereby withdrawing the brake-blocks from contact with the brake-rings and releasing the wheel.

The arms of the brake fork are preferably slotted as shown at E⁴, Fig. 2, and extensions D⁴, D⁴ on the upper parts of the brake-block levers behind the brake-blocks are received in the said slots.

In this construction of brake, the pressure is applied directly behind the brake-blocks and thus little or no strain is thrown on the front fork.

It will be observed that when the brake is applied by means of the brake lever on the handle bar the rod E' acts as a strut and is in compression. In the case where the brake is fitted so as to be applied to the back wheel of the machine, I prefer to arrange that the brake fork shall be pulled out from the center of said wheel when the brake is to be applied so that the brake rod acts as a tie and is in tension. In Figs. 3 to 5 I have shown such an arrangement. The brake apparatus is arranged in practically the same manner as hereinabove described with reference to Figs. 1 and 2 the main points of difference being as follows. The plates A' on which the brake block levers D, D are pivoted, are secured to the lower back stays A⁵, A⁵ of the frame, the pivots D' of said levers making any suitable angle therewith. The guides A⁴, A⁴ are secured on the diagonal or cross members A⁶ of the frame, springs E² being provided which tend to force the brake fork E toward the center of the wheel. The arms E³ of the brake fork are bent so as to approach each other at their outer extremity and bear on the outer ends of the brake block levers D, D, which in the case shown are not directly behind the brake-blocks; this is clearly shown in Fig. 4. It is easily seen that when the brake-rod is pulled away from the center of the wheel the brake-block levers D will be pressed toward each other and the brake blocks D² applied to the brake rings B², B², attached to the wheel rim B.

In Fig. 5 a convenient manner of connecting the brake apparatus to the brake lever on the handle bar is shown. The brake-rod E' is pivoted at F to one arm of a bell-crank lever F' which is pivoted on some part of the frame. To the other arm of the lever F' is connected by a ball and socket joint the rod F² which is adapted to be moved up and down by the brake lever on the handle bar in the usual manner. When the rod F² is moved up, the bell-crank lever F' is turned about its pivot putting the brake rod E' in tension and applying the brake as above described. When the brake lever is released the springs E² operate to push the fork E toward the center of the wheel, whereupon the arms of said fork acting on the pins D³ withdraw the brake-blocks from contact with the brake-rings.

The brake apparatus may be constructed to be applied to any suitable part of the circumference of the back wheel in a manner such as described.

My improved brake apparatus whether adapted to brake the front wheel or the back wheel can obviously be arranged so as to be applied by the foot instead of or as well as by a hand lever if desired.

In Figs. 6, 7 and 8 various forms of rim are shown fitted with brake-rings.

In Fig. 9 the brake-rings are secured to a tubular ring B⁴ through which the spokes and valve tube pass and which is secured by brazing or other suitable means to the inner surface of the rim B.

The brake-rings are preferably made of a material which is a bad conductor of heat, such as for instance "woodite," vulcanized rubber, rubber compound, vulcanized fiber, wood and the like. The said rings are made of a shape to fit the part of the rim to which they are to be applied and they may be secured to the rim in any suitable manner such as by vulcanizing, cementing, riveting or by bolts and nuts, or screws. I sometimes find it convenient to make the brake-rings removable so that they can be easily replaced when worn. In some cases I use pins to assist in holding the rings in place.

By my invention, the liability of damaging the tire or rim of the wheel by the application of the brake is completely avoided, and the rings being made of material of bad conductivity for heat prevent any heat reaching the tire or rim and injuring the same.

Although I have herein described my improved brake, and brake-rings as used with a velocipede it is evident that a brake of similar design and brake-rings can be fitted to the wheels of any vehicle if circumstances should render it undesirable that the brake should be applied to the tires or rims of said wheels.

What I claim is—

1. The combination with a wheel of levers pivoted at one end on the frame of the vehicle to which the wheel is fitted, brake-blocks secured to the free ends of said levers, and a sliding spring-controlled brake-fork, the arms of which engage the free ends of said levers to bring said brake-blocks into frictional contact with the wheel rim, substantially as described.

2. The combination with a wheel, of brake-rings attached to the side of the wheel-rim, levers pivoted at one end on the frame of the vehicle to which the wheel is fitted, brake-blocks secured to the free ends of said levers, and a sliding, spring-controlled brake-fork having inclined arms which engage the free ends of said levers to bring the brake-block into frictional contact with the brake-rings, substantially as described.

3. The combination with a wheel having a pneumatic tire fitted to its rim, of brake-rings attached to the side of the wheel-rim, levers pivoted on the frame of the vehicle to which the wheel is fitted, brake-blocks secured to said levers, a sliding, spring-controlled brake-fork having inclined arms which engage the levers and bring the brake-blocks into frictional contact with the brake-rings when the brake fork is forced against its controlling spring, and pins secured to the brake-block levers, with which pins the arms of the brake-fork engage when its controlling spring acts to release the brake, substantially as described.

4. The combination with a wheel and brake-rings attached to the rim thereof, of levers pivoted at one end to the vehicle frame and provided with brake-blocks at their free ends, a sliding, spring-controlled fork the arms of which are in sliding engagement with the free ends of said levers, and means for operating said fork, substantially as described.

In witness whereof I have hereunto set my hand this 13th day of June, 1893.

ROBERT STEUART ERSKINE.

Witnesses:
F. W. H. STALE,
THOMAS LAKE,
17 *Gracechurch Street, London, Notary's Clerk.*